United States Patent
Matsui et al.

(10) Patent No.: US 10,329,829 B2
(45) Date of Patent: Jun. 25, 2019

(54) OPENING/CLOSING DETECTION DEVICE FOR VEHICLE OPENING/CLOSING MEMBER

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Seika Matsui, Kariya (JP); Takeshi Katsuda, Nagoya (JP); Satoru Ishizaki, Tajimi (JP); Yuji Nishi, Kariya (JP)

(73) Assignees: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 56 days.

(21) Appl. No.: 15/532,392

(22) PCT Filed: Dec. 1, 2015

(86) PCT No.: PCT/JP2015/005958
§ 371 (c)(1),
(2) Date: Jun. 1, 2017

(87) PCT Pub. No.: WO2016/088359
PCT Pub. Date: Jun. 9, 2016

(65) Prior Publication Data
US 2017/0328115 A1    Nov. 16, 2017

(30) Foreign Application Priority Data

Dec. 3, 2014 (JP) ................................ 2014-245102

(51) Int. Cl.
*B60J 5/00* (2006.01)
*B60J 5/10* (2006.01)
(Continued)

(52) U.S. Cl.
CPC ............. *E05F 15/73* (2015.01); *B60J 5/00* (2013.01); *B60J 5/10* (2013.01); *B60R 13/00* (2013.01);
(Continued)

(58) Field of Classification Search
CPC ....... B60R 13/00; B60R 13/005; B60R 16/02; E05B 49/00; E05B 81/64; E05B 81/78;
(Continued)

(56) References Cited

U.S. PATENT DOCUMENTS 5,140,316 A * 8/1992 DeLand .................. B60J 5/06
180/271
8,433,445 B2 * 4/2013 Busse ................... G01S 17/026
340/5.72
(Continued)

FOREIGN PATENT DOCUMENTS

DE    10 2014 004 334 A1    10/2015
JP    2002-285755 A    10/2002
(Continued)

OTHER PUBLICATIONS

Communication dated 15864890.7 from the European Patent Office in counterpart Application No. dated Oct. 30, 2017.
(Continued)

*Primary Examiner* — Atul Trivedi
(74) *Attorney, Agent, or Firm* — Sughrue Mion, PLLC

(57) ABSTRACT

One embodiment of the present invention provides an opening/closing detection device, including: a plurality of sensors configured to be arranged along a predetermined portion of a mark attached to a vehicle; and a control unit configured to output an action trigger signal for instructing an opening action of an opening/closing body of the vehicle when detection signals representing a trace order of the predetermined portion are input from the plurality of sensors
(Continued)

that detect an order of a motion of tracing the predetermined portion of the mark by a user of the vehicle.

7 Claims, 8 Drawing Sheets

(51) Int. Cl.
| | |
|---|---|
| *B60R 13/00* | (2006.01) |
| *B60R 16/02* | (2006.01) |
| *E05B 49/00* | (2006.01) |
| *E05B 81/64* | (2014.01) |
| *E05B 81/78* | (2014.01) |
| *E05B 83/18* | (2014.01) |
| *E05F 15/73* | (2015.01) |

(52) U.S. Cl.
CPC ............ *B60R 13/005* (2013.01); *B60R 16/02* (2013.01); *E05B 49/00* (2013.01); *E05B 81/64* (2013.01); *E05B 81/78* (2013.01); *E05B 83/18* (2013.01); *E05F 2015/765* (2015.01); *E05Y 2201/68* (2013.01); *E05Y 2400/852* (2013.01); *E05Y 2400/86* (2013.01); *E05Y 2600/46* (2013.01); *E05Y 2900/531* (2013.01); *E05Y 2900/546* (2013.01)

(58) Field of Classification Search
CPC .... E05B 83/18; E05F 15/73; E05F 2015/765; E05Y 2201/68; E05Y 2400/852; E05Y 2400/86; E05Y 2600/46; E05Y 2900/531; E05Y 2900/546; B60J 5/00; B60J 5/10
USPC .......................................................... 701/49
See application file for complete search history.

(56) References Cited

U.S. PATENT DOCUMENTS

| | | | |
|---|---|---|---|
| 9,382,739 B1* | 7/2016 | Johnson | E05B 49/00 |
| 9,822,553 B1* | 11/2017 | Ho | E05B 47/0012 |
| 2003/0105559 A1 | 6/2003 | Avenel | |
| 2007/0018789 A1* | 1/2007 | Yuhara | B60R 25/245 |
| | | | 340/5.72 |
| 2007/0182215 A1 | 8/2007 | Rose et al. | |
| 2007/0216517 A1* | 9/2007 | Kurpinski | B60R 25/2036 |
| | | | 340/5.72 |
| 2008/0296926 A1* | 12/2008 | Hanzel | B60R 25/2054 |
| | | | 296/146.1 |
| 2008/0296927 A1* | 12/2008 | Gisler | E05F 15/43 |
| | | | 296/146.4 |
| 2010/0214112 A1* | 8/2010 | Ishihara | B60R 25/246 |
| | | | 340/686.1 |
| 2010/0219935 A1 | 9/2010 | Bingle et al. | |
| 2011/0140479 A1* | 6/2011 | Okada | E05B 81/78 |
| | | | 296/146.1 |
| 2011/0276234 A1* | 11/2011 | Van Gastel | E05B 81/78 |
| | | | 701/49 |
| 2012/0123649 A1* | 5/2012 | Eggers | B60R 13/07 |
| | | | 701/49 |
| 2012/0217764 A1* | 8/2012 | Ishiguro | B60R 1/00 |
| | | | 296/1.07 |
| 2013/0127980 A1* | 5/2013 | Haddick | G06F 3/013 |
| | | | 348/14.08 |
| 2014/0303852 A1* | 10/2014 | Seki | E05F 15/73 |
| | | | 701/49 |
| 2014/0309892 A1* | 10/2014 | Ricci | H04W 4/21 |
| | | | 701/49 |
| 2014/0330486 A1* | 11/2014 | Gehin | B60R 25/2054 |
| | | | 701/49 |
| 2015/0012176 A1* | 1/2015 | Schindler | B60W 50/08 |
| | | | 701/36 |
| 2015/0019085 A1 | 1/2015 | Ma | |
| 2015/0025751 A1* | 1/2015 | Sugiura | B60J 5/06 |
| | | | 701/49 |
| 2015/0325066 A1* | 11/2015 | Muller | B60R 25/2045 |
| | | | 340/5.61 |
| 2016/0083995 A1* | 3/2016 | Dezorzi | E05F 15/73 |
| | | | 340/5.72 |
| 2016/0186480 A1* | 6/2016 | Krauss | B60R 25/2054 |
| | | | 701/49 |
| 2016/0201377 A1* | 7/2016 | Nishikibe | B60J 5/047 |
| | | | 49/28 |
| 2017/0080785 A1* | 3/2017 | Azarko | G06F 3/0416 |
| 2017/0166167 A1* | 6/2017 | Heller | B60R 25/24 |
| 2017/0204650 A1* | 7/2017 | Dezorzi | E05F 15/73 |
| 2017/0328115 A1* | 11/2017 | Matsui | B60R 13/00 |
| 2018/0038146 A1* | 2/2018 | Linden | E05B 81/20 |
| 2018/0142511 A1* | 5/2018 | Lombrozo | E05F 15/627 |
| 2018/0238099 A1* | 8/2018 | Schatz | E05F 15/611 |

FOREIGN PATENT DOCUMENTS

| | | |
|---|---|---|
| JP | 2003-531976 A | 10/2003 |
| JP | 2006-277522 A | 10/2006 |
| JP | 2008-159293 A | 7/2008 |
| JP | 2008-292445 A | 12/2008 |
| JP | 4546678 B | 9/2010 |
| JP | 2012-530859 A | 12/2012 |
| JP | 2014-181499 A | 9/2014 |
| JP | 2014-201966 A | 10/2014 |
| JP | 2014-531534 A | 11/2014 |
| WO | 2012/059100 A2 | 5/2012 |
| WO | 2012/059100 A3 | 5/2012 |
| WO | 2015/144128 A1 | 10/2015 |

OTHER PUBLICATIONS

International Preliminary Report on Patentability with translation of Written Opinion dated Jun. 15, 2017 in counterpart International Application No. PCT/JP2015/005958.
Communication dated Oct. 17, 2018, from the European Patent Office in counterpart European Application No. 15864890.7.

* cited by examiner

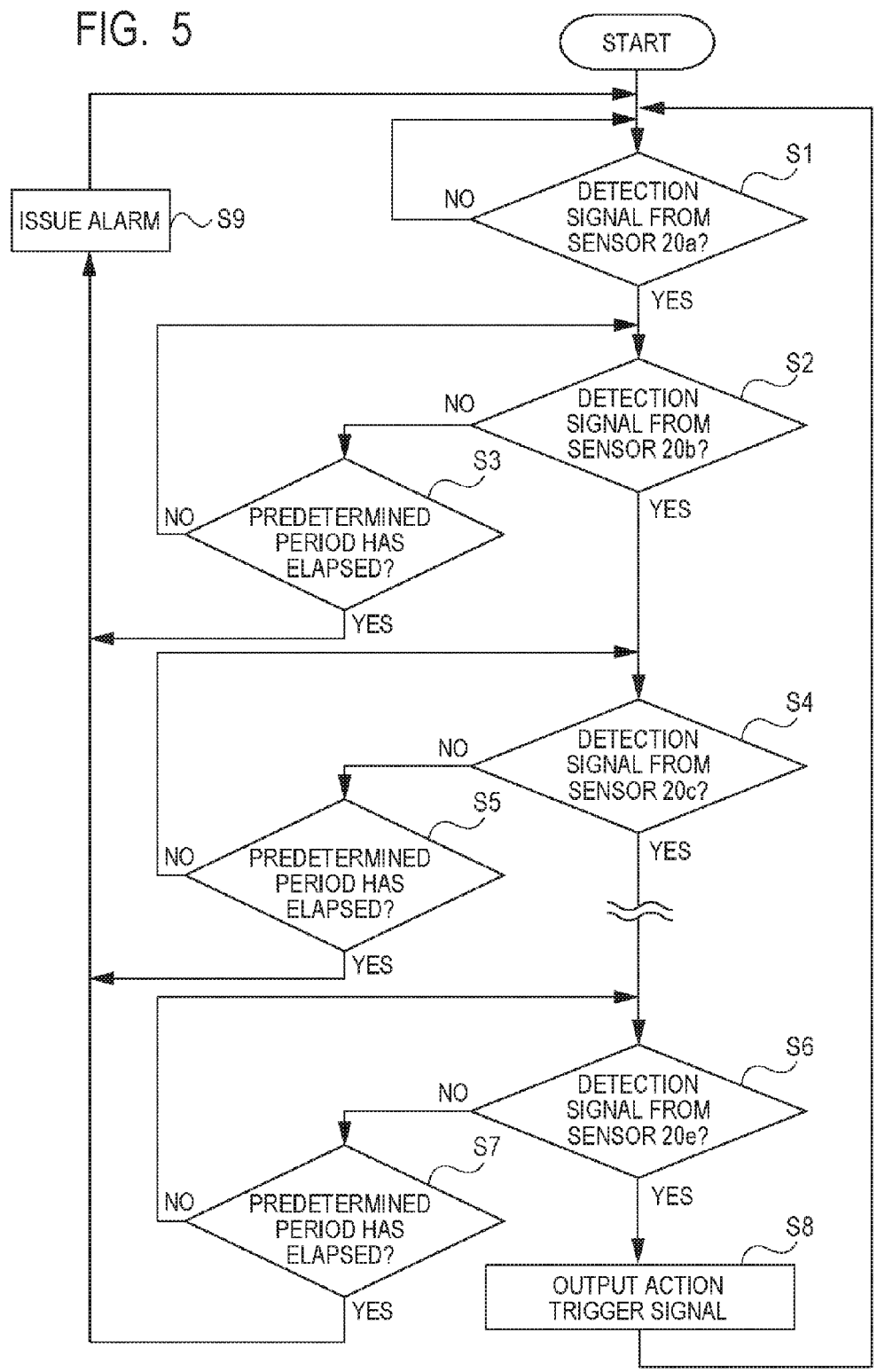

OPENING/CLOSING DETECTION DEVICE FOR VEHICLE OPENING/CLOSING MEMBER

CROSS REFERENCE TO RELATED APPLICATIONS

This application is a National Stage of International Application No. PCT/JP2015/005958, filed on Dec. 1, 2015, which claims priority from Japanese Patent Application No. 2014-245102, filed on Dec. 3, 2014, the contents of all of which are incorporated herein by reference in their entirety.

TECHNICAL FIELD

The present invention relates to an opening/closing detection device for an opening/closing body for a vehicle, and more particularly, to a technology of determining an intention of a user to open/close an opening/closing body for a vehicle based on signals from a plurality of sensors, which are arranged along a predetermined portion of a mark attached to the vehicle.

BACKGROUND ART

Hitherto, there has been known a technology of automatically carrying out an opening/closing action of an opening/closing body by holding the body (e.g., the hand or the finger) of a user over a non-contact switch attached to the opening/closing body. Patent Literature 1 provides a non-contact switch for an automatic door, which is configured to enable an easy change in an object detection direction so as to prevent an erroneous detection caused by, for example, a passerby crossing a location separated from the automatic door. According to the invention disclosed in Patent Literature 1, an appropriate object detection direction can easily be set in accordance with an installation place and an application, and even when the object detection direction is an approximately directly downward direction, a position at which the finger needs to be held over is easily understood, thereby enabling a secure detection.

CITATION LIST

Patent Literature

PTL 1: Japanese Patent Application Laid-Open No. 2008-159293

SUMMARY OF INVENTION

Technical Problem

The technology disclosed in Patent Literature 1 is basically applied to an automatic door for a construction. Influence exerted when an opening/closing body for a vehicle is erroneously opened or closed by an erroneous detection of an action sensor for a vehicle door is more significant than influence exerted when an automatic door for a construction is erroneously opened or closed by an erroneous detection of an action sensor for the automatic door for a construction. Therefore, the erroneous detection of the action sensor for the opening/closing body for a vehicle needs to be decreased as much as possible, and the problem of the erroneous detection is thus not solved even when the technology disclosed in Patent Literature 1 is applied to a vehicle.

Therefore, the present invention has an object to propose an opening/closing detection device for an opening/closing body for a vehicle, which is configured to decrease an erroneous opening/closing action of the opening/closing body for a vehicle caused by an erroneous detection of an action sensor for the opening/closing body for a vehicle.

Solution to Problem

According to one embodiment of the present invention, there is provided an opening/closing detection device, including: a plurality of sensors configured to be arranged along a predetermined portion of a mark attached to a vehicle; and a control unit configured to output an action trigger signal for instructing an opening/closing action of an opening/closing body of the vehicle when detection signals representing a trace order of the predetermined portion are input from the plurality of sensors that detect an order of a motion of tracing the predetermined portion of the mark by a user of the vehicle.

Advantageous Effects of Invention

The opening/closing detection device according to the one embodiment of the present invention is configured to output the action trigger signal of instructing the opening/closing action of the opening/closing body for a vehicle when the detection signals representing the trace order of the predetermined portion of the mark are input from the plurality of sensors that detect the order of the motion of tracing the predetermined portion of the mark by the user of the vehicle. Therefore, even when the plurality of sensors erroneously detect a vehicle, a structure, a human, or the like passing by the plurality of sensors, the vehicle, the structure, the human, or the like is rarely detected in the trace order, and thus the opening/closing body for a vehicle is less likely to be erroneously activated to open/close by the erroneous detection.

BRIEF DESCRIPTION OF DRAWINGS

FIG. 5 is a flowchart for illustrating determination of an opening/closing intention by a control unit according to the first embodiment.

DESCRIPTION OF EMBODIMENTS

In the following, a description is given of embodiments of the present invention with reference to the drawings. Note that, dimensions, materials, shapes, the relative positions of components, and the like that are mentioned in the following embodiments can be changed arbitrarily to suit the structure of a device to which the present invention is applied, or various conditions. The scope of the present invention is not limited to a mode that is described specifically in the following embodiments, unless otherwise specially noted. Components that have the same functions are denoted by the same reference symbols throughout the drawings referred to in the following description, and repetitive descriptions thereof may be omitted.

First Embodiment

Figure 1:
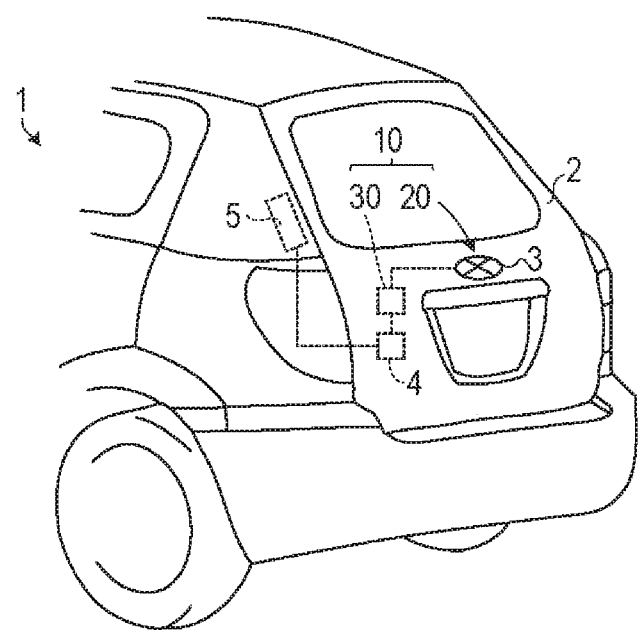
FIG. 1 is a schematic configuration diagram for illustrating a vehicle including an opening/closing detection device according to a first embodiment of the present invention.

FIG. 1 is a schematic configuration diagram for illustrating a vehicle 1 including an opening/closing detection device 10 according to a first embodiment of the present invention. The vehicle 1 includes an opening/closing body 2, a mark 3, an opening/closing body electronic control unit (ECU) 4, an opening/closing body drive device 5, and an opening/closing detection device 10.

The opening/closing body 2 is, for example, a backdoor or a power slide door of the vehicle 1, and is configured to be driven to open/close by the opening/closing body drive device 5. The opening/closing body drive device 5 is controlled by the opening/closing body ECU 4. The opening/closing body 2 may be, for example, a front door, a trunk lid, a door mirror, an engine hood, a sunroof, or a fuel lid, which is activated to open/close (activated to open or activated to close) by electric power. Moreover, the backdoor may be a power backdoor or a backdoor including a torsion spring or gas dampers.

The mark 3 is attached on a surface of the opening/closing body 2 at a position visually recognizable by the user. On this occasion, the mark 3 is a character, a graphic, a symbol, a three-dimensional shape, a combination thereof, or a combination of the above and colors. For example, as illustrated in FIG. 1, the mark 3 is an emblem attached to a backdoor, which indicates a brand, a vehicle model, or a vehicle grade of the vehicle 1. Moreover, the configuration of the mark 3 is not limited to such a case that the mark 3 is attached to the opening/closing body 2 to be subject to the action, and the mark 3 may be attached to any portion of the vehicle 1 like a center pillar. For the sake of convenience of the user, the mark 3 is preferably attached to a position that is in a vicinity of the opening/closing body 2 and can be easily reached by the hand of the user.

Figure 2:
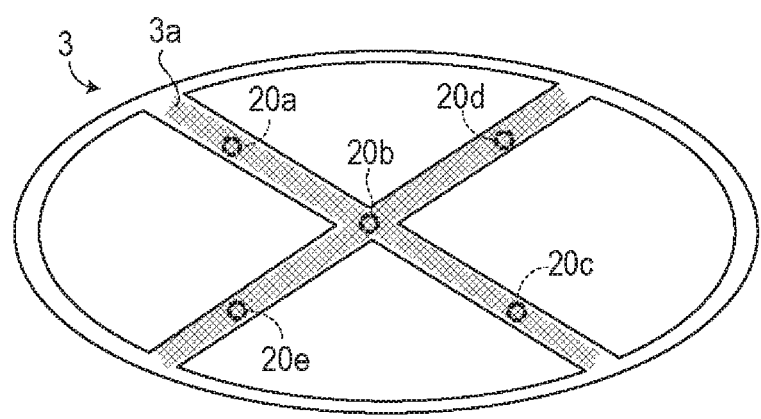
FIG. 2 is a schematic diagram for illustrating an example of a mark according to the first embodiment.

FIG. 2 is a schematic diagram for illustrating an example of the mark 3 in which a plurality of sensors 20 are arranged. The mark 3 illustrated in FIG. 2 is an emblem of the vehicle 1 constructed by a combination of an oval and a three-dimensional shape of a character X. The plurality of sensors 20 (sensors 20a to 20e) are arranged along a predetermined portion 3a (hatched portion of FIG. 2) of the mark 3. In the mark 3 illustrated in FIG. 2, the predetermined portion 3a is a three-dimensionally shaped portion of the character X.

Each of the plurality of sensors 20 is a non-contact type sensor or a contact type sensor configured to output a detection signal to the control unit 30 when the plurality of sensors 20 detect the body (e.g., the hand, the finger, or the foot) of the user. For example, the non-contact type sensor is a capacitive sensor for detecting the body of the user from a change in capacitance caused by the body of the user that has entered a detection range. The contact type sensor is, for example, a pressure sensor or a membrane sensor for detecting the body of the user in accordance with a change in pressure applied to the sensor. As the plurality of sensors 20, infrared sensors, ultrasonic sensors, photoelectric sensors, laser sensors, or cameras may be used, for example. Moreover, the detection signal may be a signal having a one-bit value, and in this case, each of the plurality sensors 20 is configured to output a value "1" to the control unit 30 when the body of the user is detected. The plurality of sensors 20 can detect a motion of the body of the user at the predetermined portion 3a from positions of the respective sensors 20a to 20e and timings at which the respective sensors 20a to 20e detect the body of the user. For example, the plurality of sensors 20 can detect a movement order of the body of the user among the respective sensors 20a to 20e.

Figure 3:
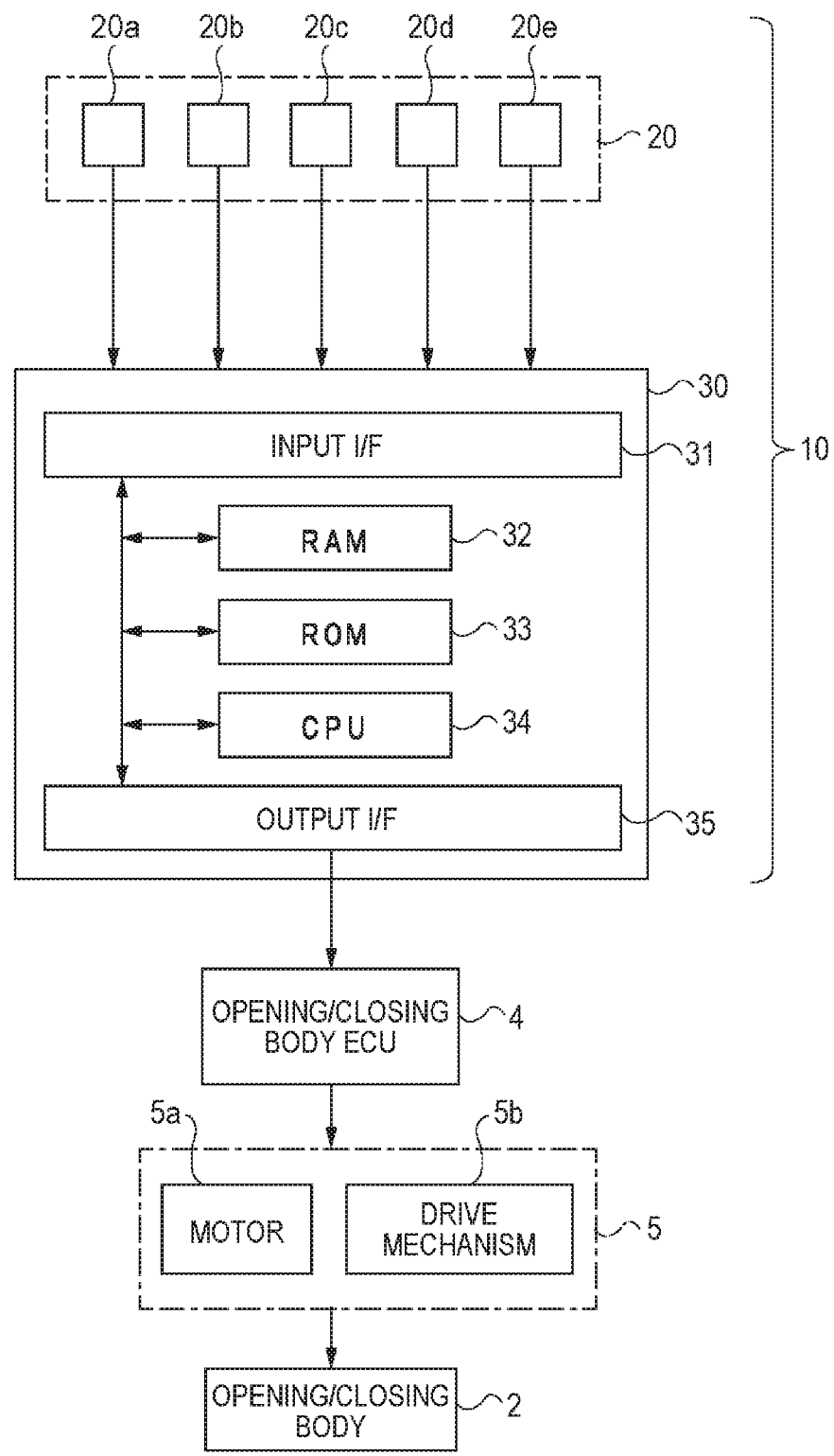
FIG. 3 is a block diagram for illustrating the opening/closing detection device and other components according to the first embodiment.

FIG. 3 is a block diagram for illustrating the opening/closing detection device 10, the opening/closing body ECU 4, and other components. The opening/closing detection device 10 includes the plurality of sensors 20 and the control unit 30. The control unit 30 is a computer including an input interface (I/F) 31, a random access memory (RAM) 32, a read only memory (ROM) 33, a central processing unit (CPU) 34, and an output I/F 35. Functions of the control unit 30 described later may be implemented by software processing using the above-mentioned components 31 to 35, or may be implemented by hardware processing using logic circuits, which are not described in detail here.

The input I/F 31 is configured to input detection signals from the plurality of sensors 20, and covert the signals to data that can be processed by the CPU 34, and the data is temporarily stored in the RAM 32. The CPU 34 is configured to process the data based on a predetermined program stored in advance in the ROM 33, and output a processing result to the opening/closing body ECU 4 via the output I/F 35. In other words, the control unit 30 is configured to determine an opening/closing intention of the user relating to the opening/closing body 2 based on the detection signals from the plurality of sensors 20, and output, to the opening/closing body ECU 4, a signal (referred to as "action trigger signal") for instructing the opening action or the closing action of the opening/closing body 2. The action trigger signal may be a signal having a one-bit value, or a signal having a plurality of bits. Moreover, communication between the plurality of sensors 20 and the control unit 30 may be serial communication or parallel communication.

When the opening/closing body ECU 4 inputs the action trigger signal from the opening/closing detection device 10, the opening/closing body ECU 4 changes the polarity of the voltage applied to a motor 5a of the opening/closing body drive device 5 in accordance with the opened/closed state of the opening/closing body 2, thereby controlling a rotation action and a rotation direction (forward rotation or backward rotation) of the motor 5. For example, when the opening/closing body ECU 4 determines that the opening/closing body 2 has already been closed, the opening action of the opening/closing body 2 is requested, and thus the opening/closing body ECU 4 rotates the motor 5a forward. Moreover, when the opening/closing body ECU 4 determines that the opening/closing body 2 has already been opened, the closing action of the opening/closing body 2 is requested, and thus the opening/closing body ECU 4 rotates the motor 5a backward. The forward rotation of the motor 5a corresponds to the opening action of the opening/closing body 2, and the backward rotation of the motor 5a corresponds to the closing action of the opening/closing body 2, but the correspondence between the rotation direction and the action is not limited to this case. Moreover, the opening/closing body ECU 4 is preferably configured to store the opened/closed state of the opening/closing body 2 at the time of the previous opening/closing action of the opening/closing body 2, and use the stored state to determine the opened/closed state of the opening/closing body 2. The rotation of the motor 5a is transmitted to the opening/closing body 2 via a drive mechanism 5b, thereby opening or closing the opening/closing body 2.

In a case where the opening/closing body 2 is a backdoor including a torsion spring or gas dampers, the opening/closing body ECU 4 releases a lock of the backdoor when the opening/closing body ECU 4 inputs the action trigger signal relating to the opening intention of the user from the opening/closing detection device 10. As a result, the back door is opened by a force of the torsion spring or the gas dampers. Moreover, means for determining the opened/closed state of the opening/closing body 2 may be provided in the opening/closing detection device 10, and the opening/closing detection device 10 may be configured to output, to the opening/closing body ECU 4, the action trigger signal together with information on an opening/closing direction of the opening/closing body 2.

Figure 4A:
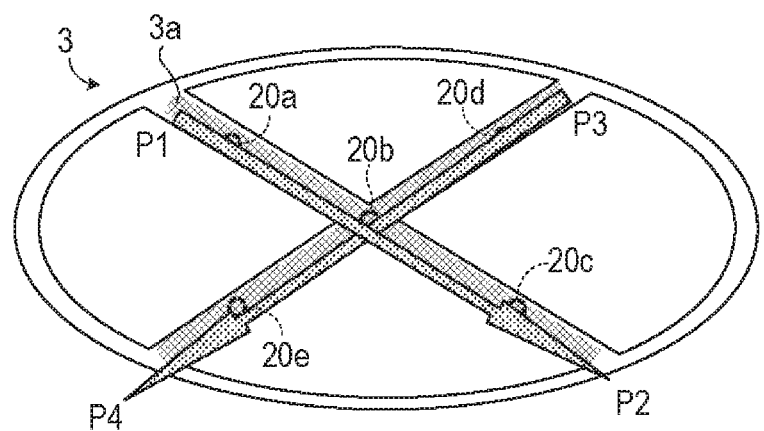
FIG. 4A is a schematic diagram for illustrating an example of a trace order on the mark according to the first embodiment.
Figure 4B:
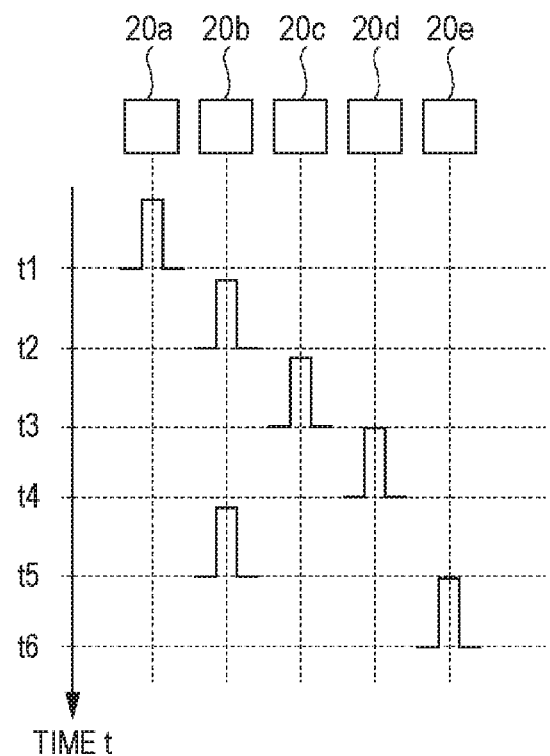
FIG. 4B is a timing chart for illustrating an example of the trace order on the mark according to the first embodiment.

Referring to FIG. 4A, FIG. 4B, and FIG. 5, a method of determining the opening/closing intention of the user by the opening/closing detection device 10 is now described. For the sake of simplicity of description, in the following, the opening action of the opening/closing body 2 based on the opening intention of the user is described, but the action is not limited to the opening action.

According to the first embodiment, the user can use the body (e.g., the finger or the hand) to carry out a motion of tracing the predetermined portion 3a of the mark 3, thereby communicating the opening intention of the user relating to the opening/closing body 2 to the opening/closing detection device 10. On this occasion, the respective sensors 20a to 20e out of the plurality of sensors 20 of the opening/closing detection device 10 detect the body of the user in an order (referred to "trace order") of the motion of the user of tracing the predetermined portion 3a of the mark 3, and detection signals are input to the control unit 30 from the respective sensors 20a to 20e of the plurality of sensors 20 in the trace order of the predetermined portion 3a.

Herein, "tracing" (or "trace") contains such a meaning that the body of the user is moved along the predetermined portion 3a of the mark 3 while the body is in contact with the predetermined portion 3a (in a contact state). Further, "tracing" (or "trace") also contains such a meaning that the body of the user is moved along the predetermined portion 3a while the body is separated from the predetermined portion 3a (in a non-contact state). When contact type sensors are used as the plurality of sensors 20, the user needs to bring the body in contact with the predetermined portion 3a, whereas, when non-contact type sensors of a non-contact type are used, the user does not need to bring the body in contact with the predetermined portion 3a.

For example, as illustrated in FIG. 4A, when the user traces the predetermined portion 3a of the mark 3 from P1 to P2, and from P3 to P4 as in a stroke order of the character X, the sensors 20a, 20b, 20c, 20d, 20b, and 20e sequentially output the detection signals to the control unit 30. In this case, as illustrated in a timing chart of FIG. 4B, the control unit 30 inputs the detection signal from the sensor 20a at a time t1, and inputs the detection signal from the sensor 20b at a time t2. Then, the control unit 30 inputs the detection signal from the sensor 20c at a time t3, inputs the detection signal from the sensor 20d at a time t4, inputs the detection signal from the sensor 20b at a time t5, and inputs the detection signal from the sensor 20e at a time t6. This trace order may be appropriately set in accordance with preference of the user.

FIG. 5 is a flowchart for illustrating determination processing for the opening intention of the user carried out by the CPU 34 of the control unit 30 based on a program stored in advance in the ROM 33. The flowchart of FIG. 5 may start when the opening/closing detection device 10 receives supply of power from a battery of the vehicle 1, and may be repeated at a cycle of an order of, for example, milliseconds. Moreover, power is saved by decreasing the power supplied to the control unit 30 until the sensor 20a corresponding to a start of the trace order detects the body of the user, and increasing the supply of the power after the detection to start fully carrying out this determination processing.

First, in Step S1, the control unit 30 determines whether or not the detection signal has been input from the sensor 20a corresponding to the start position in the trace order of the predetermined portion 3a of the mark 3. When the detection signal has been input from the sensor 20a (Yes in Step S1), in Step S2, the control unit 30 determines whether or not the detection signal has been input from the sensor 20b corresponding to a next position in the trace order. When the detection signal has not been input from the sensor 20b (No in Step S2), in Step S3, the control unit 30 determines whether or not a predetermined period has elapsed after the detection signal was input from the sensor 20a. On this occasion, the predetermined period may be approximately one second, or may be a value on an order of from milliseconds to microseconds, and is set in consideration of convenience of the user, for example. When the predetermined period is determined to have elapsed (Yes in Step S3), in Step S9, for example, the control unit 30 may issue an alarm sound or alarm light to notify the user of the failure of the opening action. Step S9 may be omitted.

When the detection signal has been input from the sensor 20b before the predetermined period has elapsed (Yes in Step S2), in Step S4, the control unit 30 determines whether or not the detection signal has been input from the sensor 20c corresponding to a next position in the trace order. When the detection signal has not been input from the sensor 20c (No in Step S4), in Step S5, the control unit 30 determines whether or not the predetermined period has elapsed after the detection signal was input from the sensor 20b. Subsequently, the same processing is repeated also for the sensors 20d and 20b. Then, in Step S6, the control unit 30 determines whether or not the detection signal has been input from the sensor 20e corresponding to a last position in the trace order. When the detection signal has not been input from the sensor 20e (No in Step S6), in Step S7, the control unit 30 determines whether or not the predetermined period has elapsed after the detection signal was input from the sensor 20*b*.

When the detection signal is input from the sensor 20*e* before the predetermined period has elapsed (Yes in Step S6), in Step S8, the control unit 30 determines that the user has the opening intention relating to the opening/closing body 2, and outputs the action trigger signal to the opening/closing body ECU 4. On this occasion, the control unit 30 may generate, for example, a confirmation sound to notify the user of a successful opening action, or prompt the user to depart from the opening/closing body 2 when outputting the action trigger signal.

In this way, the control unit 30 of the opening/closing detection device 10 can determine the opening intention of the user relating to the opening/closing body 2 based on the detection signals representing the trace order of the plurality of sensors 20. According to the first embodiment, when the detection signal has not been input in each step of determining the absence/presence of the input of the detection signal, it is determined whether or not the predetermined period has elapsed. However, the configuration is not limited to this case, and the control unit 30 may be configured to avoid outputting the action trigger signal when a total period from the first determination step to the last determination step is more than a predetermined period.

The control unit 30 may determine the opening intention of the user in the following way. As shown in Table 1, the control unit 30 of the opening/closing detection device 10 generates a table on the RAM 32 in an order of input of the detection signals from the plurality of sensors 20, and compares an action condition table stored in advance in the ROM 33 and the generated table with each other. When both of the tables match each other, the control unit 30 may determine that the user has the opening/closing action intention and output the action trigger signal to the opening/closing body ECU 4.

TABLE 1

| Order | Generated table | Action condition table |
|---|---|---|
| 1 | Detection signal of sensor 20a | Detection signal of sensor 20a |
| 2 | Detection signal of sensor 20b | Detection signal of sensor 20b |
| 3 | Detection signal of sensor 20c | Detection signal of sensor 20c |
| 4 | Detection signal of sensor 20d | Detection signal of sensor 20d |
| 5 | Detection signal of sensor 20b | Detection signal of sensor 20b |
| 6 | Detection signal of sensor 20e | Detection signal of sensor 20e |

Moreover, as shown in Table 2, when the generated table and the action condition table match to some extent (e.g., 80 to 90 percent), the control unit 30 may determine that the user has the opening intention and output the action trigger signal to the opening/closing body ECU 4.

TABLE 2

| Order | Generated table | Action condition table | Match |
|---|---|---|---|
| 1 | Detection signal of sensor 20a | Detection signal of sensor 20a | Yes |
| 2 | Detection signal of sensor 20b | Detection signal of sensor 20b | Yes |
| 3 | Detection signal of sensor 20c | Detection signal of sensor 20c | Yes |
| 4 | Detection signal of sensor 20d | Detection signal of sensor 20d | Yes |
| 5 | Detection signal of sensor 20d | Detection signal of sensor 20b | No |
| 6 | Detection signal of sensor 20e | Detection signal of sensor 20e | Yes |

As described above, the opening/closing detection device 10 according to the first embodiment is configured to output the action trigger signal for instructing the opening/closing action of the opening/closing body 2 of the vehicle 1 when the plurality of sensors 20 detect the order of the motion of tracing the predetermined portion 3*a* of the mark 3 by the user of the vehicle 1 and the detection signals are input from the plurality of sensors 20 in the trace order of the predetermined portion 3*a* of the mark 3. Therefore, even when the plurality of sensors 20 erroneously detect a vehicle, a structure, or a human passing by the plurality of sensors 20, the vehicle, the structure, or the human is rarely detected erroneously in the trace order, and thus the opening/closing body 2 is less likely to be erroneously activated to open/close. Moreover, the erroneous action of the opening/closing body caused by erroneous detection can be decreased by increasing the number of the plurality of sensors 20. In this case, it may be considered that the user has difficulty in memorizing the order of tracing the plurality of sensors 20. However, the user only needs to trace the mark 3, and does not particularly need to memorize the trace order, and thus the convenience for the user increases. Moreover, the user only needs to trace the predetermined portion 3*a* of the mark 3 in order to activate the opening/closing body 2 to open/close, and thus does not have to take out and operate a wireless key, or memorize a complicated motion for the opening/closing. In particular, when the predetermined portion 3*a* of the mark 3 represents a character or the like and the stroke order thereof is set as the trace order, the user does not need to memorize a special motion. Moreover, when the predetermined portion 3*a* is a door outside handle or the like, through setting of opening/closing action directions of the opening/closing body 2 as the trace order, the user can carry out the opening/closing action of the opening/closing body 2 by a natural motion. Moreover, when non-contact sensors are used as the plurality of sensors 20, the user does not have to touch the vehicle 1, and thus does not have to worry about his or her fingers, hands, or other parts of the body becoming dirty. Moreover, embedding of the plurality of sensors 20 along the predetermined portion 3*a* of the mark 3 (in particular, an emblem) eliminates the need for provision of an independent member for the plurality of sensors 20, and the plurality of sensors 20 do not appear on an exterior of the vehicle 1, which is advantageous in terms of design.

Second Embodiment

Referring to FIG. 6A, FIG. 6B, FIG. 7, and FIG. 8, the opening/closing detection device 10 according to a second embodiment of the present invention is now described. Compared with the first embodiment, the control unit 30 of the opening/closing detection device 10 according to the second embodiment further includes an authentication unit 36 and a separation determination unit 37.

Figure 6A:
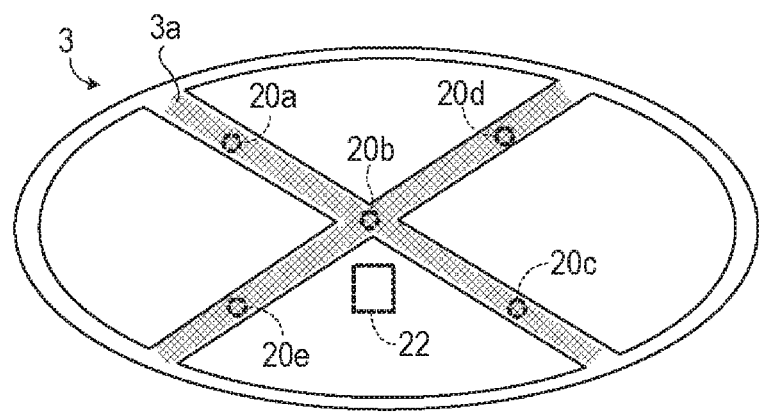
FIG. 6A is a schematic diagram for illustrating an example of the mark according to a second embodiment of the present invention.

As illustrated in FIG. 6A, in the second embodiment, in addition to the sensors (20a to 20e) arranged along the predetermined portion 3a of the mark 3, a distance measurement sensor 22 is arranged. The distance measurement sensor 22 is an infrared sensor configured to measure a distance d from the distance measurement sensor 22 to the body of the user, namely, a distance from the opening/closing body 2 to which the mark 3 is attached to the body of the user, based on reflection of an infrared ray irradiated on the body of the user, and output distance information to the control unit 30. Moreover, for example, an ultrasonic sensor or a laser sensor may be used as the distance measurement sensor 22. Moreover, the configuration of the distance measurement sensor 22 is not limited to such a case that the distance measurement sensor 22 is arranged in the mark 3, and the distance measurement sensor 22 may be arranged at an arbitrary position on the opening/closing body 2 or the vehicle 1 at which the distance from the opening/closing body 2 to the body of the user can be measured. Moreover, although a detailed description is not given here, the configuration of the second embodiment is not limited to such a case that the distance measurement sensor 22 is provided, and information from a clearance sonar or the like originally provided in the vehicle 1 for other purposes may be used instead of providing the distance measurement sensor 22.

Figure 6B:
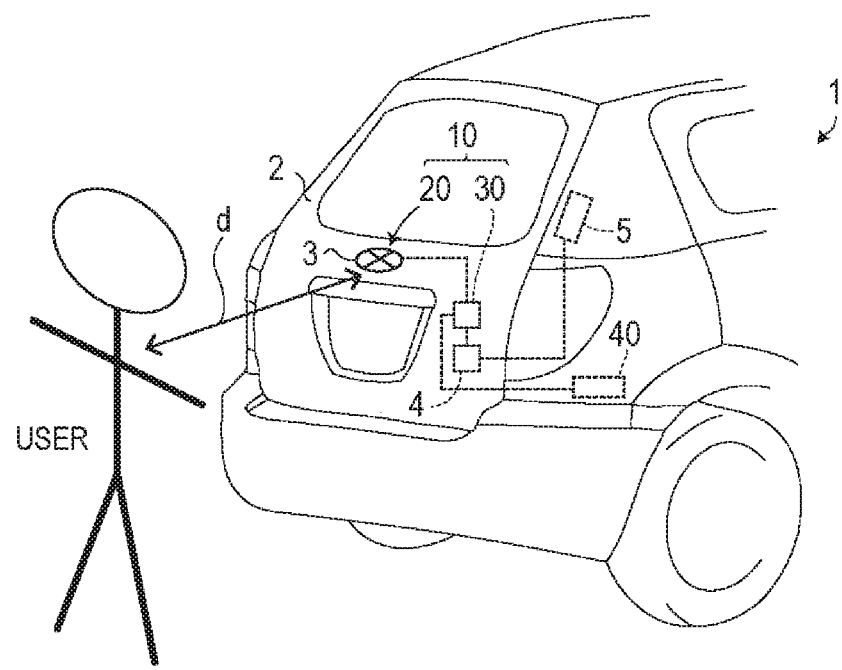
FIG. 6B is a schematic configuration diagram for illustrating a vehicle including an opening/closing detection device according to the second embodiment.
Figure 7:
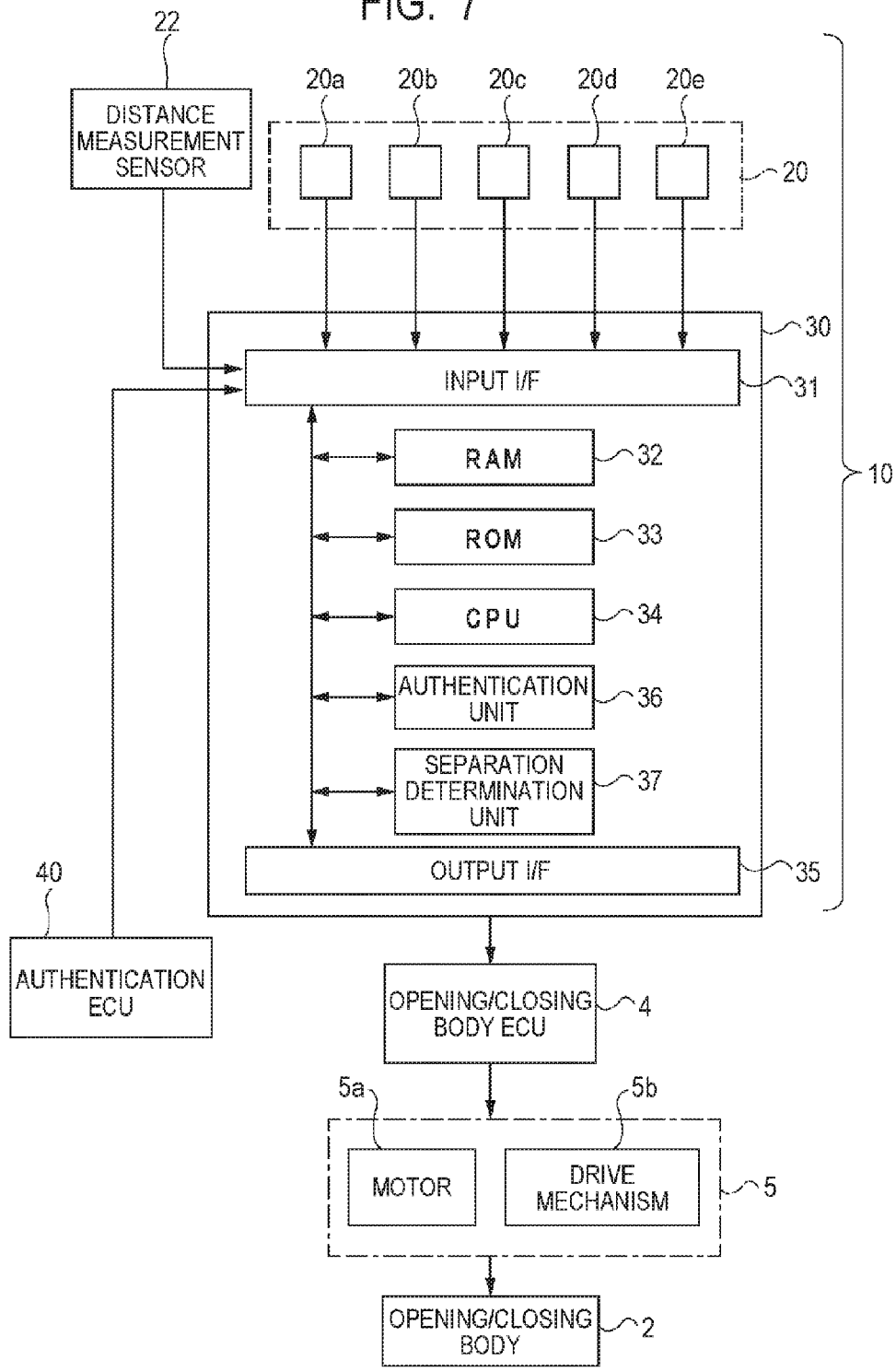
FIG. 7 is a block diagram for illustrating the opening/closing detection device and other components according to the second embodiment.

As illustrated in FIG. 6B, an authentication ECU 40 is installed on the vehicle 1, and the authentication ECU 40 is connected to the control unit 30 of the opening/closing detection device 10. When the user enters a predetermined range of the vehicle 1, the authentication ECU 40 carries out wireless communication to/from a smart entry key held by the user, thereby determining that the user holding the smart entry key is a legitimate user of the vehicle 1 (successful authentication). Then, the authentication ECU 40 transmits authentication information on the successful authentication to the control unit 30.

The authentication unit 36 determines whether or not the user tracing the plurality of sensors 20 is an authenticated person based on the authentication information from the authentication ECU 40. When the user is determined not to be authenticated, the control unit 30 avoids outputting the action trigger signal.

Moreover, the separation determination unit 37 determines whether or not the distance d from the distance measurement sensor 22 to the body of the user, namely, the distance from the opening/closing body 2 to which the mark 3 is attached to the body of the user, is equal to or more than a threshold distance $d_{th}$ based on the distance information from the distance measurement sensor 22. When it is determined that the distance d is less than the threshold distance $d_{th}$, the control unit 30 avoids outputting the action trigger signal. On this occasion, the threshold distance $d_{th}$ is preferably set in accordance with an opening/closing trajectory of the opening/closing body 2. In other words, the threshold distance $d_{th}$ is set so that the body of the user is separated from the opening/closing body 2 by the threshold distance $d_{th}$ or more to prevent the body of the user from colliding with the opening/closing body 2 during the opening/closing action.

Figure 8:
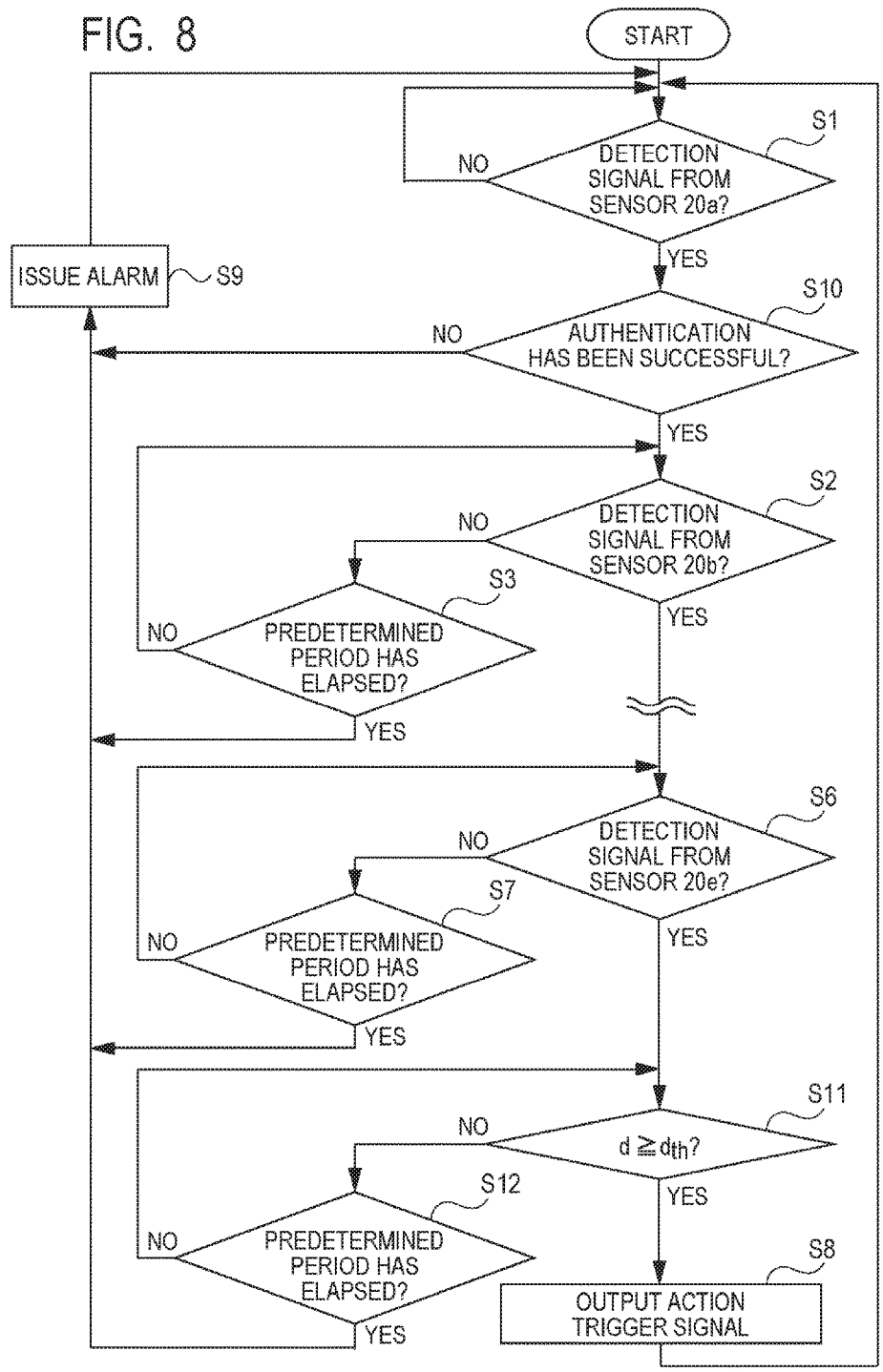
FIG. 8 is a flowchart for illustrating determination of an opening/closing intention by the control unit according to the second embodiment.

FIG. 8 is a flowchart for illustrating determination processing for the opening/closing intention of the user according to the second embodiment. Steps in which the same processing is carried out as that of the flowchart of FIG. 5 are denoted by the same reference symbols, and are not further described.

In Step S10, the authentication unit 36 of the control unit 30 determines whether or not the authentication that the user tracing the plurality of sensors 20 is a legitimate user of the vehicle 1 has been successful based on the authentication information from the authentication ECU 40. When the authentication has not been successful (No in Step S10), the flow is discontinued, and an alarm is issued to the user (Step S9). Step S9 may be omitted. When the authentication has been successful (Yes in Step S10), Steps S2 to S6 are then carried out.

In Step S11, the separation determination unit 37 of the control unit 30 determines whether or not the distance d from the opening/closing body 2 to the body of the user is equal to or more than the threshold distance $d_{th}$ based on the distance information from the distance measurement sensor 22. When the distance d is less than the threshold distance $d_{th}$ (No in Step S11), in Step S12, the control unit 30 determines whether or not a predetermined period has elapsed. The predetermined period used in this step is preferably set to a period sufficient for the body of the user to depart from the opening/closing body 2, and is thus more than the predetermined period used in Steps S3 and S7. Then, when the distance d is equal to or more than the threshold distance $d_{th}$ (Yes in Step S11), the control unit 30 outputs the action trigger signal to the opening/closing body ECU 4.

As described above, the opening/closing detection device 10 according to the second embodiment is configured avoid outputting the action trigger signal for the opening/closing body 2 even when a person who is not a legitimate user of the vehicle 1 carries out the operation, and can increase crime prevention performance in addition to the above-mentioned advantages. Moreover, the opening/closing detection device 10 is configured avoid outputting the action trigger signal for the opening/closing body 2 unless the body of the user is separated from the opening/closing body 2 by a distance equal to or more than the threshold distance $d_{th}$, and can thus decrease the possibility that the body of the user collides with the opening/closing body 2 during the opening/closing action.

Other Embodiments

Figure 9A:
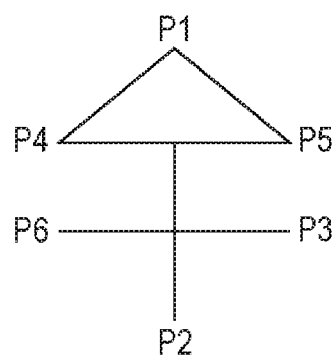
FIG. 9A is a schematic diagram for illustrating an example of a mark according to another embodiment of the present invention.
Figure 9B:
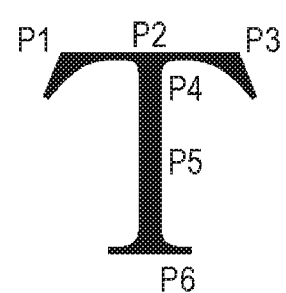
FIG. 9B is a schematic diagram for illustrating an example of a mark according to another embodiment of the present invention.
Figure 9C:
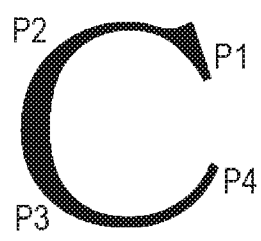
FIG. 9C is a schematic diagram for illustrating an example of a mark according to another embodiment of the present invention.
Figure 9D:
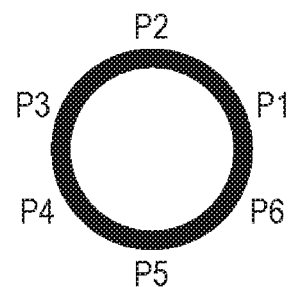
FIG. 9D is a schematic diagram for illustrating an example of a mark according to another embodiment of the present invention.

FIG. 9A to FIG. 9D are schematic diagrams for illustrating variations of the mark 3. In FIG. 9A to FIG. 9D, P1 to P6 indicate that the action trigger signal is output when the trace is carried out in this order. As illustrated in FIG. 9A, a complex graphic may be used as the mark 3, thereby increasing security. Moreover, as illustrated in FIG. 9B, the mark 3 may be formed as a character "T" so that the action trigger signal is output when the trace is carried out in the stroke order of the character "T". Moreover, as illustrated in FIG. 9C and FIG. 9D, the mark 3 may be set to the character "C" or a graphic of "0" so that the action trigger signal is output by a motion of tracing in a manner of a single stroke.

Moreover, the opening/closing detection device 10 may be configured avoid outputting the action trigger signal when the vehicle 1 is traveling at a speed equal to or more than a predetermined speed based on information from a speed sensor (not shown) installed on the vehicle 1. Moreover, the determination of the opening/closing intention by the control unit 30 of the opening/closing detection device 10 may be implemented by software processing, or may be implemented by hardware processing.

This application claims the benefit of priority from Japanese Patent Application No. 2014-245102, filed on Dec. 3, 2014, the content of which is incorporated herein by reference.

REFERENCE SIGNS LIST

1: vehicle, 2: opening/closing body, 3: mark, 3*a*: predetermined portion of mark, 4: opening/closing body ECU, 5: opening/closing body drive device, 10: opening/closing detection device, 20: plurality of sensors, 30: control unit

The invention claimed is:

1. An opening/closing detection device, comprising:
a plurality of sensors configured to be arranged along a trace order of one character at a predetermined portion of a mark attached to a vehicle; and
a control unit configured to output an action trigger signal for instructing an opening action of an opening/closing body of the vehicle when detection signals representing the trace order of the one character are input from the plurality of sensors.

2. An opening/closing detection device according to claim 1, further comprising
a distance measurement sensor configured to detect a distance between a user and the mark,
wherein the control unit is configured to avoid outputting the action trigger signal when the control unit determines that the distance between the user and the mark is less than a threshold distance based on distance information from the distance measurement sensor.

3. An opening/closing detection device according to claim 1, wherein the control unit is configured to avoid outputting the action trigger signal when the control unit determines that the user is not authenticated.

4. An opening/closing detection device according to claim 1, wherein the mark comprises an emblem of the vehicle.

5. An opening/closing detection device according to claim 1, wherein the plurality of sensors comprise sensors of a non-contact type.

6. An opening/closing detection device according to claim 1, wherein
the control unit outputs the action trigger signal for instructing the opening action of the opening/closing body of the vehicle when detection signals representing a trace order in a stroke order of the one character.

7. An opening/closing detection device according to claim 1, wherein
the control unit outputs the action trigger signal for instructing the opening action of the opening/closing body of the vehicle when detection signals representing a trace order in a manner of a single stroke of the one character.

* * * * *